US012075143B2

(12) United States Patent
Hwang et al.

(10) Patent No.: US 12,075,143 B2
(45) Date of Patent: Aug. 27, 2024

(54) ELECTRONIC DEVICE INCLUDING CAMERA AND METHOD OF OPERATING THE SAME

(71) Applicant: Samsung Electronics Co., Ltd., Gyeonggi-do (KR)

(72) Inventors: Youngjae Hwang, Gyeonggi-do (KR); Hyunho Yu, Gyeonggi-do (KR); Youngbok Yu, Gyeonggi-do (KR); Dongsung Hur, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 169 days.

(21) Appl. No.: 17/945,239

(22) Filed: Sep. 15, 2022

(65) Prior Publication Data

US 2023/0014687 A1    Jan. 19, 2023

Related U.S. Application Data

(63) Continuation of application No. PCT/KR2022/004575, filed on Mar. 31, 2022.

(30) Foreign Application Priority Data

Apr. 9, 2021   (KR) .......................... 10-2021-0046620

(51) Int. Cl.
*H04N 23/54*    (2023.01)
*G02B 3/12*    (2006.01)
(Continued)

(52) U.S. Cl.
CPC .............. *H04N 23/54* (2023.01); *G02B 3/12* (2013.01); *G02B 3/14* (2013.01); *G02B 7/021* (2013.01);
(Continued)

(58) Field of Classification Search
CPC ........ H04N 23/51; H04N 23/54; H04N 23/55; H04N 23/57; H04N 23/6812;
(Continued)

(56) References Cited

U.S. PATENT DOCUMENTS 9,164,202 B2 * 10/2015 Batchko .................. G02B 3/12
2007/0154198 A1    7/2007 Oh et al.
(Continued)

FOREIGN PATENT DOCUMENTS

JP         2008-65221 A    3/2008
KR    10-2006-0016970 A    2/2006
(Continued)

*Primary Examiner* — Lin Ye
*Assistant Examiner* — Chriss S Yoder, III
(74) *Attorney, Agent, or Firm* — Cha & Reiter, LLC

(57) ABSTRACT

An electronic device is disclosed, including a housing, an optical image stabilization (OIS) coil and an auto-focus (AF) coil, a first lens disposed along an optical axis, a second lens disposed under the first lens, and a third lens disposed under the second lens, the second lens is deformable according to movement of an AF carrier, an OIS carrier including an OIS magnet disposed corresponding to the OIS coil of the housing, and configured to move the third lens along a direction perpendicular to the optical axis, wherein the AF carrier includes an AF magnet corresponding to the AF coil, to move the second lens along the optical axis, and a processor configured to apply a current to the OIS coil to move the OIS carrier, resulting in movement of the third lens in the direction perpendicular to the optical axis, and apply a current to the AF coil to deform the second lens by movement of the AF carrier.

20 Claims, 11 Drawing Sheets

(51) Int. Cl.
*G02B 3/14* (2006.01)
*G02B 7/02* (2021.01)
*G02B 7/09* (2021.01)
*G02B 27/64* (2006.01)
*G03B 3/00* (2021.01)
*G03B 13/36* (2021.01)
*G03B 17/12* (2021.01)
*H04M 1/02* (2006.01)
*H04N 23/55* (2023.01)
*H04N 23/57* (2023.01)
*H04N 23/68* (2023.01)

(52) U.S. Cl.
CPC ............. *G02B 7/09* (2013.01); *G02B 27/646* (2013.01); *G03B 3/00* (2013.01); *G03B 13/36* (2013.01); *G03B 17/12* (2013.01); *H04M 1/0264* (2013.01); *H04N 23/55* (2023.01); *H04N 23/57* (2023.01); *H04N 23/687* (2023.01)

(58) Field of Classification Search
CPC .... H04N 23/687; H04M 1/02; H04M 1/0264; G02B 3/12; G02B 3/14; G02B 7/09; G02B 7/021; G02B 27/646; G03B 3/00; G03B 5/04; G03B 13/36; G03B 17/12; G03B 2205/0007
See application file for complete search history.

(56) References Cited

U.S. PATENT DOCUMENTS

| | | |
|---|---|---|
| 2015/0002726 A1 | 1/2015 | Schmieder et al. |
| 2017/0054883 A1 | 2/2017 | Sharma et al. |
| 2018/0364399 A1* | 12/2018 | Hu ..................... G02B 13/0075 |
| 2019/0104239 A1 | 4/2019 | Aschwanden et al. |
| 2019/0141248 A1 | 5/2019 | Hubert et al. |
| 2019/0238728 A1 | 8/2019 | Hwang et al. |
| 2020/0116974 A1 | 4/2020 | Saito et al. |
| 2020/0310006 A1 | 10/2020 | Craen et al. |
| 2020/0409171 A1 | 12/2020 | Xu |
| 2021/0033844 A1* | 2/2021 | Park ....................... G03B 30/00 |
| 2023/0388634 A1* | 11/2023 | Song ...................... H04N 23/55 |

FOREIGN PATENT DOCUMENTS

| | | |
|---|---|---|
| KR | 10-2011-0096384 A | 8/2011 |
| KR | 10-2018-0123376 A | 11/2018 |
| KR | 10-2019-0090293 A | 8/2019 |
| KR | 10-2021-0026659 A | 3/2021 |

* cited by examiner (9-1)

(9-2)

ELECTRONIC DEVICE INCLUDING CAMERA AND METHOD OF OPERATING THE SAME

CROSS-REFERENCE TO RELATED APPLICATION(S)

This application is a continuation of International Application No. PCT/KR2022/004575, which was filed on Mar. 31, 2022, and claims priority to Korean Patent Application No. 10-2021-0046620, filed on Apr. 9, 2021, in the Korean Intellectual Property Office, the disclosures of which are incorporated by reference herein their entirety.

TECHNICAL FIELD

Certain embodiments of the present document relate to an electronic device with cameras, and more particularly, a digital camera in which a lens does not protrude from a surface of the same during an auto-focusing operation.

DESCRIPTION OF RELATED ART

In digital photography, optical image stabilization (OIS) compensates for hand tremors to create more stable images. Auto-focus (AF) allows an electronic camera or electronic device to automatically handle focusing of the image, relieving a user of the duty. Typically, OIS and AF are implemented through the lenses of the camera, and involve a coil and magnet. Specifically, the coil or magnet may be moved in a particular direction by magnetic force generated by the coil or magnet, when a current is applied. This movement may be used to implement OIS and/or AF. Various implementations have been developed, such as the Solenoid-based method, and a Lorentz-method, etc.

Sometimes, the OIS and AF mechanism can be designed as an integral structure for moving the camera lenses. For example, a ball guide can be disposed on an AF carrier, and an OIS carrier can be disposed on the ball guide, and the lenses can be disposed on the OIS carrier. As the AF carrier and the OIS carrier are moved, the lenses will thus perform AF and OIS functionality.

SUMMARY

There is a problem with reduction of space efficiency for design and increase in a size of a camera module, when a separate space is secured for AF implementation with integrally moving lenses.

There is a problem in that current consumption is large when moving all the lenses, as compared to moving some of the lenses.

There is a need for more efficient performance of AF without integrally moving the lenses, while also increasing a space efficiency and/or decreasing of current consumption.

In certain embodiments of the disclosure, an electronic device is disclosed, including: a housing, including an optical image stabilization (OIS) coil and an auto-focus (AF) coil, a first lens disposed along an optical axis disposed within the housing, a second lens disposed under the first lens, and a third lens disposed under the second lens, wherein the second lens is deformable according to movement of an AF carrier, an OIS carrier including an OIS magnet disposed in a position corresponding to the OIS coil of the housing, and is configured to move the third lens in a direction perpendicular to the optical axis, wherein the AF carrier is coupled to the OIS carrier, and includes an AF magnet disposed in a position corresponding to the AF coil, and configured to move the second lens along the optical axis, and a processor electrically connected to the OIS coil and the AF coil, wherein the processor is configured to control application of a current to the OIS coil to move the OIS carrier, resulting in movement of at least the third lens in the direction perpendicular to the optical axis, and control application of a current to the AF coil to deform the second lens by movement of the AF carrier.

In certain embodiments of the disclosure, an electronic device is disclosed, including: a housing including an auto-focus (AF) coil, a first lens disposed along an optical axis within the housing, a second lens disposed under the first lens, and a third lens disposed under the second lens, wherein the second lens is deformable according to movement of an AF carrier, wherein the AF carrier is coupled onto the housing, and includes an AF magnet disposed in a position corresponding to the AF coil of the housing, and is configured to move the second lens along the optical axis, and a processor electrically connected to the AF coil, wherein the processor is configured to control application of a current to the AF coil to cause the AF carrier to move and deform the second lens.

According to certain embodiments of the present document, the efficiency of space utilization in the electronic device may be increased, since it is no longer necessary to provide a separate space for AF implementation. Further, as the lenses included in the electronic device do not move integrally, an overall size of the camera module may be reduced.

According to certain embodiments of the present document, current consumption may be reduced because the electronic device performs the AF function using some of the lenses.

Effects obtainable based on certain embodiments are not limited to the effects mentioned above, and other effects not mentioned could be clearly understood by those having an ordinary skill in the art to which the present disclosure belongs from the description below.

DETAILED DESCRIPTION

Figure 1:
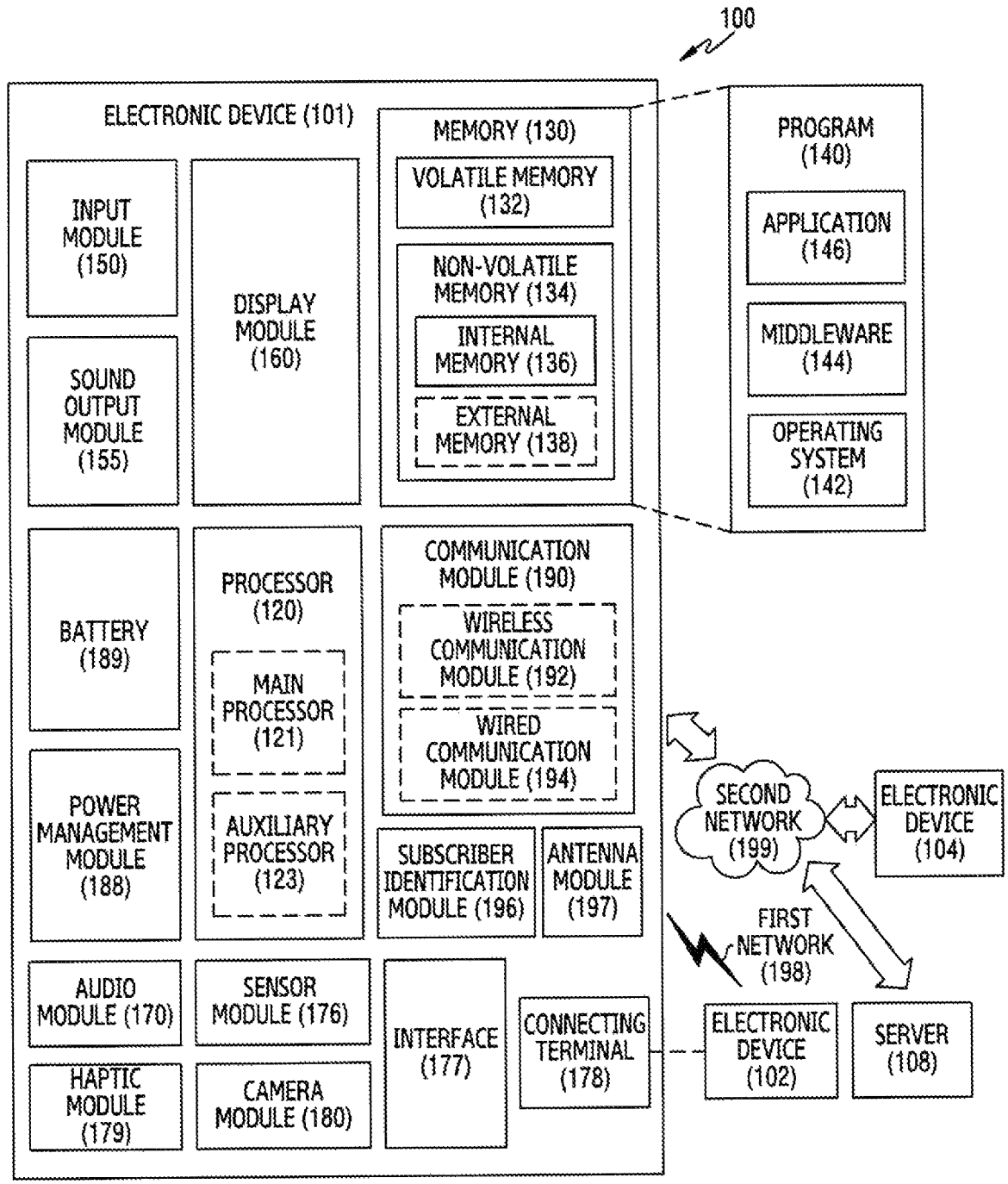
FIG. 1 is a block diagram of an electronic device in a network environment according to an embodiment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
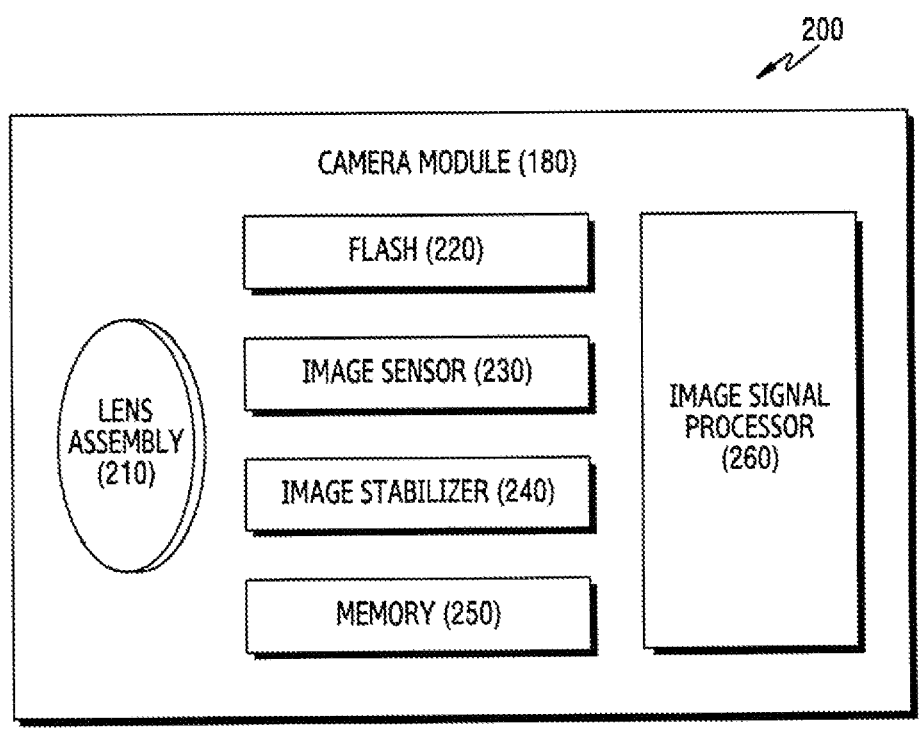
FIG. 2 is a block diagram illustrating a camera module according to an embodiment.

FIG. 2 is a block diagram 200 illustrating the camera module 180 according to certain embodiments.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
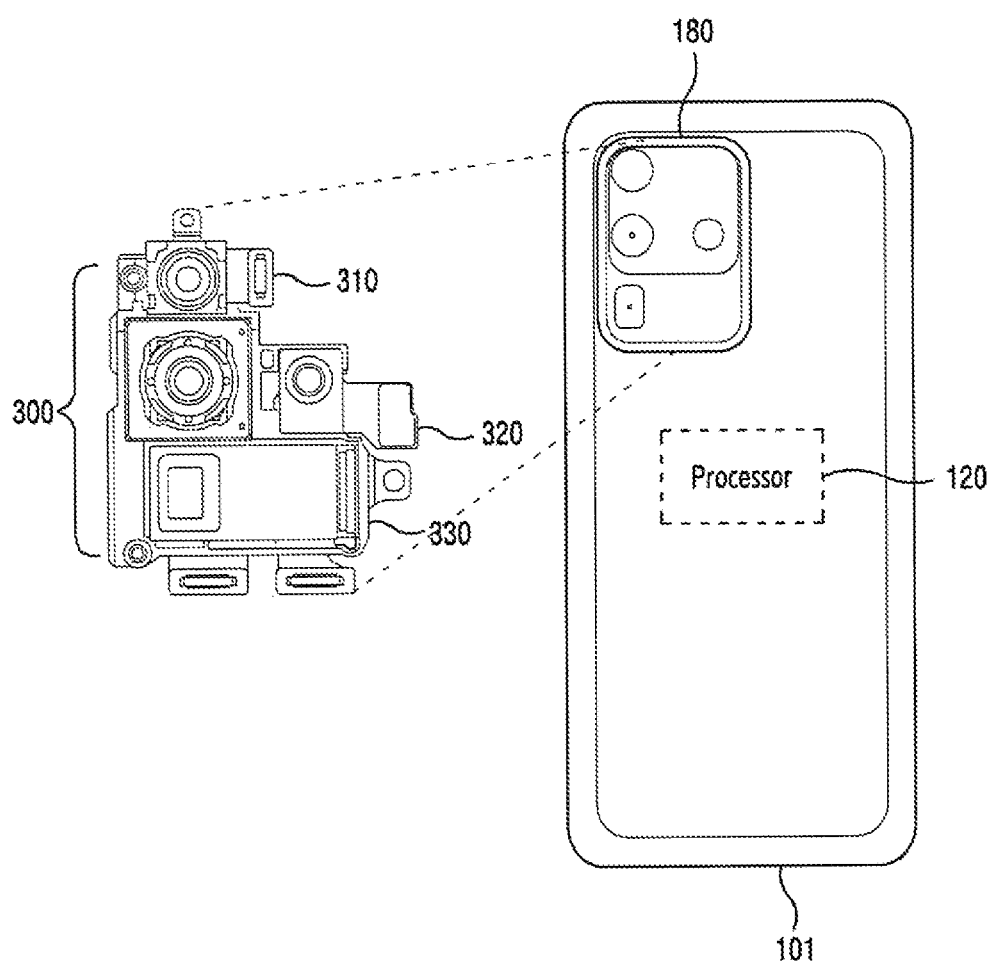
FIG. 3 is a diagram schematically illustrating a structure of an electronic device including a camera according to an embodiment.

FIG. 3 is a diagram schematically illustrating a structure of an electronic device including a camera according to an embodiment. FIG. 3 may be a diagram schematically illustrated for description convenience's sake about an operation of the electronic device 101.

In an embodiment, the electronic device 101 may include at least a processor 120 and a camera module 180.

In an embodiment, the camera module 180 may include a plurality of cameras (e.g., a first camera 310, a second camera 320, and a third camera 330). The number and arrangement of the cameras shown in FIG. 3 are a mere example; it is understood the actual number and arrangement may not be limited thereto.

In an embodiment, the plurality of cameras (e.g., the first camera 310, the second camera 320, and the third camera 330) may have the same or similar structure to each other.

In an embodiment, the plurality of cameras (e.g., the first camera 310, the second camera 320, and the third camera 330) may perform OIS and AF for the sake of compensating for hand trembling and auto focus, respectively.

In an embodiment, the processor 120 may control a current flowing through the plurality of cameras (e.g., the first camera 310, the second camera 320, and the third camera 330). For example, the processor 120 may control an electrical current flowing through the first camera 310 wherein the first camera 310 may perform OIS and/or AF.

In certain embodiments, since each of the plurality of cameras including the first camera 310, the second camera 320, and the third camera 330 has the same or similar structure, they may be commonly referred to as the "camera 300" in describing related structures.

Figure 4:
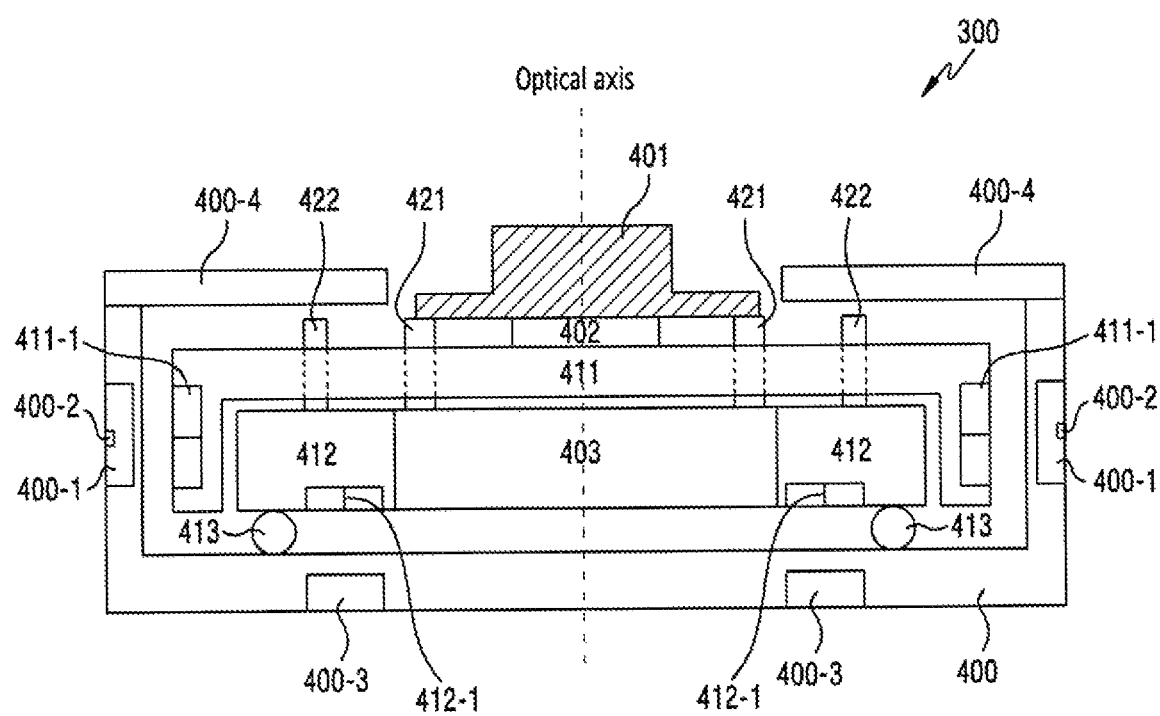
FIG. 4 is a diagram conceptually illustrating a structure of a camera according to an embodiment.

FIG. 4 is a diagram conceptually illustrating a structure of a camera according to an embodiment. In detail, FIG. 4 is a diagram conceptually illustrating a structure and connection relationship of the camera 300.

In an embodiment, a first lens 401, a second lens 402, and a third lens 403 may be disposed along an optical axis. For example, the centers of the first lens 401, the second lens 402, and the third lens 403 may be disposed along the optical axis.

In an embodiment, a housing 400 may form a periphery of the camera 300 while surrounding the first lens 401, the second lens 402, and the third lens 403.

In an embodiment, the housing 400 may form the periphery of the camera 300 while surrounding an AF carrier 411 and an OIS carrier 412.

In an embodiment, the housing 400 may include an AF coil 400-1 and an AF Hall sensor 400-2 (or a pair thereof, as seen in FIG. 4), and the AF coil 400-1 and the AF Hall sensor 400-2 may be disposed such that the pair is symmetrically placed on two sides of the optical axis (e.g., hereinafter "symmetrically about").

In an embodiment, the housing 400 may include an OIS coil 400-3, and the OIS coil 400-3 may be disposed symmetrically about the optical axis.

In an embodiment, an OIS ball 413 (e.g., a ball bearing) may be disposed on the housing 400. For example, the OIS ball 413 may be disposed so as to contact with the housing 400. For another example, the OIS ball 413 may move within a predetermined range on a surface of the housing 400.

In an embodiment, the OIS carrier 412 may be disposed on the OIS ball 413. The OIS carrier 412 may be disposed so as to be in contact with the OIS ball 413. The OIS ball 413 may reduce friction between the OIS carrier 412 and the housing 400, by forming a point of contact between the OIS carrier 412 and the housing 400. The above-described role may be performed by moving the OIS ball 413 on the housing 400, or may be performed when the OIS ball 413 is inserted into a groove formed in the housing 400 and is not moved. The rotation of the OIS ball 413 and the movement of the OIS carrier 412 may occur together.

In an embodiment, the third lens 403 may be disposed in the OIS carrier 412. For example, a space accommodating the third lens 403 may be formed in the OIS carrier 412 in a form of a hole, and the third lens 403 may be disposed in the accommodation space (e.g., the hole) on the OIS carrier 412. For another example, the OIS carrier 412 may be formed so as to surround the third lens 403.

In an embodiment, the OIS carrier 412 may include an OIS magnet 412-1. For example, the OIS magnet 412-1 may be disposed in a position of the OIS carrier 412 corresponding to the OIS coil 400-3 of the housing 400. Also, the OIS magnet 412-1 may be disposed in the OIS carrier 412 so as to be placed symmetrically about the optical axis.

In an embodiment, the AF carrier 411 may be disposed on the OIS carrier 412. For example, an AF driving shaft 422 may be coupled onto the OIS carrier 412, on which the AF carrier 411 may be disposed. In a specific example, the AF driving shaft 422 is coupled onto the OIS carrier 412 and the AF driving shaft 422 is coupled to the AF carrier 411, and the AF carrier 411 may be coupled to the OIS carrier 412.

In an embodiment, the AF carrier 411 may include an AF magnet 411-1. For example, the AF magnets 411-1 may be disposed symmetrically about the optical axis. In another example, the AF magnet 411-1 may be disposed in a position of the AF carrier 411 corresponding to the AF coil 400-1 disposed in the housing 400.

In an embodiment, the AF carrier 411 may be coupled to the second lens 402. For example, as shown in FIG. 4, the AF carrier 411 and at least a part of a lower surface of the second lens 402 may contact one another, and in a state in which at least a part of the lower surface of the second lens 402 contacts to the AF carrier 411, it may be coupled to the AF carrier 411. For another example, unlike the example shown in FIG. 4, the AF carrier 411 may be in contact with at least a part of a side surface of the second lens 402, and in a state in which at least a part of the side surface of the second lens 402 is in contact with the AF carrier 411, it may be coupled to the AF carrier 411. Also, unlike the example shown in FIG. 4, the AF carrier 411 may be in contact with at least a part of an upper surface of the second lens 402, and in a state in which at least a part of the upper surface of the second lens 402 is in contact with the AF carrier 411, it may be coupled with the AF carrier 411.

In an embodiment, the first lens 401 may be disposed on the second lens 402. For example, at least a part of the upper surface of the second lens 402 may be in contact with and be coupled with the first lens 401.

In an embodiment, the first lens 401 may be coupled to the third lens 403 through a connection member 421. For example, at least a part of the first lens 401 may be coupled to the connection member 421, and the connection member 421 may be coupled to the third lens 403, whereby the first lens 401 and the third lens 403 may be coupled to each other.

In an embodiment, a shield cover 400-4 may cover an inside of the housing 400 may be disposed on the housing 400. For example, the shield cover 400-4 may form an upper periphery of the camera 300, thereby covering the components inside the housing 400. For another example, the housing 400 and the shield cover 400-4 may form a periphery of the camera 300.

In an embodiment, the first lens 401 may be visible from the outside of the camera 300 through a hole formed in the shield cover 400-4. For example, the shield cover 400-4 may form a part of the periphery of the camera 300, and the shield cover 400-4 forming the upper periphery has the hole through which the first lens 401 may be seen.

In an embodiment, a processor (e.g., the processor 120) may control a current flowing through the AF coil 400-1 and/or OIS coil 400-3 included in the housing 400. For example, the processor 120 may adjust the electric current flowing through the AF coil 400-1 and/or the OIS coil 400-3, thereby controlling the movement of the AF magnet 411-1 and/or the OIS magnet 412-1. Also, the processor 120 may control the movement of the AF magnet 411-1 and/or the OIS magnet 412-1, thereby enabling the camera 300 to perform AF and/or OIS functions.

In an embodiment, the processor (e.g., the processor 120) may control the movement of the AF magnet 411-1 and the OIS magnet 412-1 using a Lorentz method and/or a solenoid method.

According to an embodiment, the camera 300 may include another sensor for detecting the movement (e.g., and/or a position of an optical axis direction) of at least one magnetic material (e.g., the AF magnet 411-1). For example, the camera 300 may include a tunnel magneto-resistance sensor (TMR sensor), and may detect the movement of the magnetic material, by using a resistance value that varies based on relative angles of a plurality of magnetic materials of the TMR sensor. Also, according to another embodiment, the camera 300 may detect the movement of the magnetic material by using an anisotropic magneto-resistance (AMR) sensor or a giant magneto-resistance (GMR) sensor.

Figure 5:
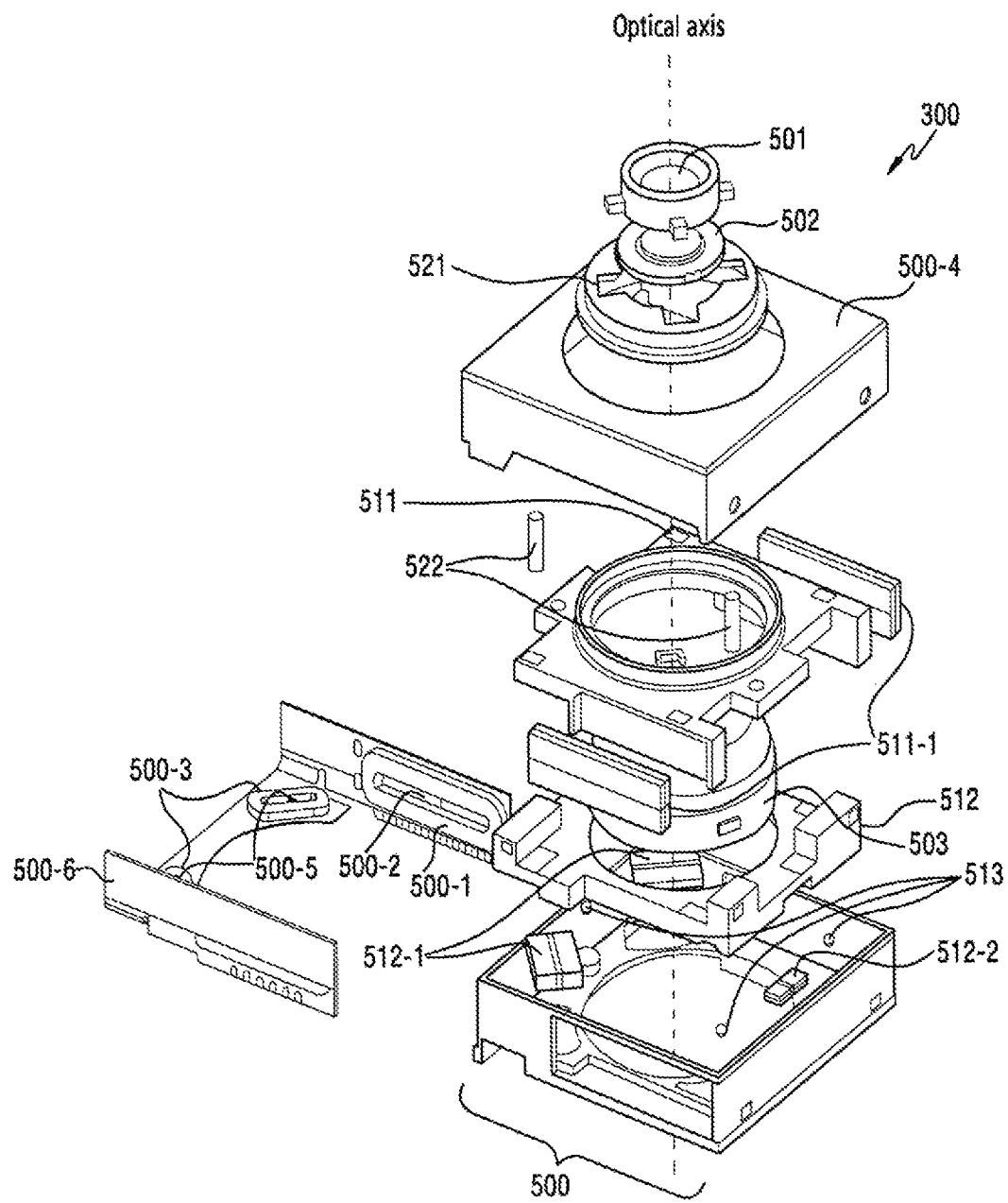
FIG. 5 is an exploded perspective view specifically illustrating a structure of a camera according to an embodiment.

FIG. 5 is an exploded perspective view specifically illustrating a structure of a camera according to an embodiment. In detail, FIG. 5 is an exploded perspective view illustrating an example structure and connection relationship of the camera 300, conceptually shown previously in FIG. 4.

In an embodiment, a housing 500 and a shield cover 500-4 may form a periphery of the camera 300. For example, the housing 500 may form a lower periphery of the camera 300, and the shield cover 500-4 may form an upper periphery of the camera 300. The housing 500 forming the lower periphery of the camera 300 and the shield cover 500-4 forming the upper periphery of the camera 300 may be coupled to each other, thereby forming the periphery of the camera 300.

In an embodiment, the housing 500 may be coupled to an FPCB 500-6. For example, the FPCB 500-6 may be coupled to an interior of the housing 500.

In an embodiment, the FPCB 500-6 may include at least one of an AF coil 500-1, an AF Hall sensor 500-2, an OIS coil 500-3, and an OIS Hall sensor 500-5. For example, the AF coil 500-1 and the AF Hall sensor 500-2 may be disposed symmetrically about an optical axis. Also, the OIS coil 500-3 and the OIS Hall sensor 500-5 may also be disposed symmetrically about the optical axis. For another example, the AF coil 500-1 and the AF Hall sensor 500-2 may be coupled to a side surface within the FPCB 500-6. The OIS coil 500-3 may be coupled to a lower surface within the FPCB 500-6. The OIS Hall sensor 500-5 (e.g., AK7322C) may be included within the OIS coil 500-3, and the OIS Hall sensor 500-5 may thereby detect a position of an OIS magnet 512-1.

In an embodiment, the AF coil 500-1 and the AF Hall sensor 500-2 may be disposed on a surface (e.g., the side surface of the FPCB 500-6) that is parallel to an optical axis direction within the FPCB 500-6, and the OIS coil 500-3 and the OIS Hall sensor 500-5 may be disposed on a surface (e.g., the lower surface of the FPCB 500-6) that is perpendicular to the optical axis direction. In an embodiment, the surface on which the AF coil 500-1 and the AF Hall sensor 500-2 are disposed and the surface on which the OIS coil 500-3 and the OIS Hall sensor 500-5 are disposed may be in a substantially perpendicular relationship.

In an embodiment, a yoke may be included between an OIS carrier 512 and the OIS magnet 512-1. For example, the yoke may provide shielding from magnetic fields. A magnetic field may be generated via a magnetic material (e.g., the OIS magnet 512-1), but the magnetic field may be prevented from affecting electrical elements (e.g., a circuit board or an image sensor) disposed inside the camera 300 via the shield.

In an embodiment, the FPCB 500-6 may include a multilayer ceramic capacitor (MLCC) (not shown). For example, the multilayer ceramic capacitor (not shown) may control a flow of an electrical current within the camera 300 and may prevent the occurrence of an electromagnetic interference phenomenon.

In an embodiment, an OIS ball 513 (e.g., a ball bearing) may be disposed on the housing 500. For example, a plurality of OIS balls 513 may be disposed on a lower surface within the housing 500. The OIS ball 513 may support the movement of the OIS carrier 512 on the OIS ball 513. In an embodiment, the OIS ball 513 may be formed to have a size (diameter) of about 8 mm, and may be disposed between the OIS magnets 512-1 and/or between the OIS magnet 512-1 and the induction magnet 512-2, to facilitate smooth movement of the OIS carrier 512.

In an embodiment, the OIS carrier 512 may be disposed on the OIS ball 513 within the housing 500. For example, the OIS carrier 512 may be disposed so as to be in contact with the OIS ball 513. The OIS carrier 512 may be in contact with the OIS ball 513, and may move together with the OIS ball 513. For another example, the OIS ball 513 may support the OIS carrier 512 on a bottom surface thereof.

In an embodiment, the OIS magnet 512-1 and the induction magnet 512-2 may be coupled to the OIS carrier 512. For example, the OIS magnet 512-1 may be coupled to the OIS carrier 512 symmetrically about the optical axis. Also, the OIS magnet 512-1 may be disposed in a position of the OIS carrier 512 corresponding to a position of the OIS coil 500-3 of the housing 500.

In an embodiment, an OIS yoke member (not shown) may be coupled to a position of the FPCB 500-6 corresponding to the position in which the OIS magnet 512-1 is disposed. For example, the OIS yoke member (not shown) may participate in resetting of the OIS magnet 512-1 to the original position, after the OIS magnet 512-1 has moved as the camera 300 performs the OIS function.

In an embodiment, the induction magnet 512-2 may be disposed at a center-based opposite side (e.g., a surface on the housing 500) of a position where the OIS magnet 512-1 is disposed. For example, the induction magnet 512-2 may participate in resetting to the original position when the camera 300 performs OIS. The induction magnet 512-2 may be coupled to the center-based opposite side of the position where the OIS magnet 512-1 is disposed. During the reset operation, the induction magnet 512-2 may attract the OIS magnet 512-1 via magnetic force, thereby providing facilitating motion of the resetting operation of the OIS magnet 512-1 to its original position, as performed by the OIS yoke member (not shown) coupled to the FPCB 500-6.

In an embodiment, the third lens 503 may be disposed on the OIS carrier 512. For example, the OIS carrier 512 may support the third lens 503 in the form of surrounding the third lens 503. The OIS carrier 512 may have a hole-shaped arrangement space for receiving the third lens 503, and the third lens 503 may be supported by the OIS carrier 512 by insertion into the arrangement space of the OIS carrier 512.

In an embodiment, the OIS carrier 512 may move in a direction substantially perpendicular to an optical axis. For example, the OIS carrier 512 may move in the direction substantially perpendicular to the optical axis by a driving force of the OIS coil 500-3 and the OIS magnet 512-1. For another example, the OIS carrier 512 may move along with the OIS ball 513 in the direction substantially perpendicular to the optical axis. Also, the OIS carrier 512 may move together with the third lens 503 in the direction substantially perpendicular to the optical axis.

In an embodiment, the AF carrier 511 may be disposed on the OIS carrier 512 and/or the third lens 503. For example, the AF carrier 511 may be positionally disposed on the OIS carrier 512 and/or the third lens 503, and the OIS carrier 512 and/or the third lens 503 may support the AF carrier 511. For another example, the AF carrier 511 may be formed so as to surround the third lens 503, and the AF carrier 511 may be disposed in a corresponding position on the third lens 503 in the above-described form.

In an embodiment, the AF carrier 511 may be coupled to the OIS carrier 512 by means of an AF driving shaft 522. For example, the AF driving shaft 522 may be coupled to the OIS carrier 512. Also, the AF driving shaft 522 may be coupled to the AF carrier 511, thereby coupling the OIS carrier 512 and the AF carrier 511.

In an embodiment, an AF magnet 511-1 may be coupled to the AF carrier 511. For example, the AF magnet 511-1 may be coupled to the AF carrier 511 at a position corresponding to the position of the AF coil 500-1 of the housing 500. For another example, the AF magnets 511-1 may be disposed on the AF carrier 511 symmetrically about the optical axis.

In an embodiment, the AF carrier 511 may move along the optical axis direction. For example, the AF carrier 511 may move along the optical axis direction via a driving force generated via the AF coil 500-1 and AF magnet 511-1.

In an embodiment, the AF carrier 511 may be coupled to the second lens 502 without a connection member. For example, at least a part of the AF carrier 511 may be in contact with the second lens 502, and thereby coupled to the second lens 502 without any intervening connection member.

In an embodiment, the AF carrier 511 may be coupled to the second lens 502 by a connection member 521. For example, the AF carrier 511 and the second lens 502 may be connected via the connection member 521. At least a part of the AF carrier 511 and the connection member 521 may be coupled and the connection member 521 and the second lens 502 may be coupled, and accordingly the AF carrier 511 and the second lens 502 may be coupled.

In an embodiment, the AF carrier 511 and the second lens 502 may be coupled, whereby at least a part of the second lens 502 may move together via movement of the AF carrier 511.

In an embodiment, the first lens 501 may be disposed on the second lens 502. For example, the first lens 501 may be positionally disposed on the second lens 502. Since the first lens 501 does not move along a direction of the optical axis, the first lens 501 may participate in the OIS function, without participating in the AF function. For another example, at least a part of an upper surface of the second lens 502 may be in contact with and coupled to a lower surface of the first lens 501.

In an embodiment, the housing 500 and the shield cover 500-4 may form a periphery of the camera 300 while surrounding at least the OIS carrier 512, the AF carrier 511, and the lenses (e.g., the first lens 501, the second lens 502, and the third lens 503).

In an embodiment, the first lens 501, the second lens 502, and the third lens 503 may be disposed along the optical axis. For example, the center of the first lens 501, the second lens 502, and the third lens 503 may be disposed along the optical axis.

Figure 6:
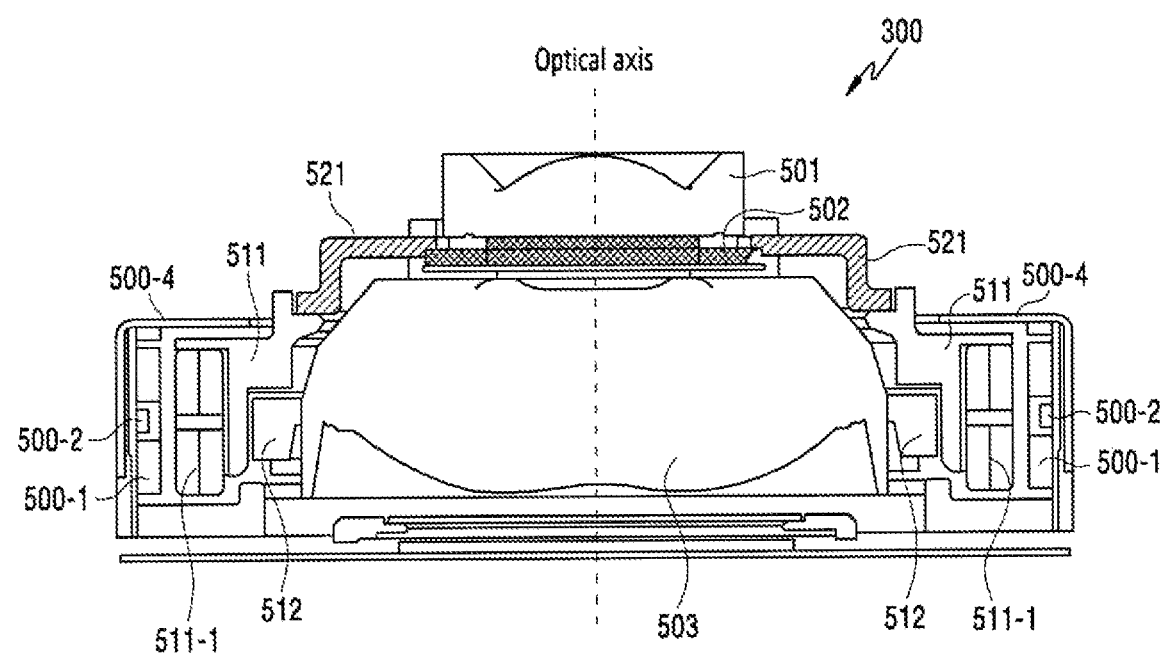
FIG. 6 is a diagram illustrating a combined structure of a camera according to an embodiment.

FIG. 6 is a diagram illustrating a combined structure of a camera according to an embodiment. In detail, FIG. 6 is a diagram showing a cross-section of a state in which the components of the camera 300 are combined and showing from a viewpoint in which the camera 300 performs AF and thus, a description may be made in which some of the OIS-related components is omitted.

In an embodiment, the shield cover 500-4 may form an upper periphery of the camera 300. For example, a housing (e.g., the housing 500) forming a lower periphery of the camera 300 and the shield cover 500-4 forming an upper periphery of the camera 300 may be combined, thereby together forming a combined periphery of the camera 300.

In an embodiment, the OIS carrier 512 may be disposed around the third lens 503. For example, the OIS carrier 512 may be disposed around the third lens 503 while surrounding a periphery of the third lens 503. Also, the OIS carrier 512 may at least support the third lens 503 at a bottom surface thereof. For another example, the OIS carrier 512 may be in contact while surrounding the third lens 503, and as the OIS carrier 512 moves, the third lens 503 may move in a direction substantially perpendicular to an optical axis direction.

In an embodiment, the OIS carrier 512 may move in the direction substantially perpendicular to an optical axis. In an embodiment, the AF carrier 511 may be disposed on the OIS carrier 512.

In an embodiment, the AF magnet 511-1 may be disposed on the AF carrier 511 symmetrically about the optical axis. In an embodiment, the AF coil 500-1 and the AF Hall sensor 500-2 may be disposed symmetrically about the optical axis, in the housing 500. In an embodiment, the AF coil 500-1 and the AF Hall sensor 500-2 may be disposed in a position corresponding to a position of the AF magnet 511-1 of the AF carrier 511, in the housing 500.

In an embodiment, the AF carrier 511 may move in a direction along the optical axis via a driving force generated from the AF coil 500-1 and the AF magnet 511-1.

In an embodiment, the AF carrier 511 may be coupled to the second lens 502 through the connection member 521. For example, at least a part of the AF carrier 511 may be coupled to the connection member 521, and at least a part of the connection member 521 may be coupled to the second lens 502. For another example, the connection member 521 may be coupled to a part of an upper surface of the second lens 502 as well, and may be coupled to a part of a side surface of the second lens 502 as well. Also, the connection member 521 may be coupled to a part of a lower surface of the second lens 502 as well. It is understood these descriptions are mere examples, and other variations of the coupling method are contemplated insofar as they are compatible with this disclosure.

In an embodiment, the AF carrier 511 may be coupled to the second lens 502 without the connection member 521. For example, at least a part of the AF carrier 511 may be in contact with at least a part of the second lens 502, thereby being coupled to the second lens 502.

In an embodiment, the second lens 502 may be disposed over the third lens 503. For example, the second lens 502 may be coupled to the AF carrier 511, and the second lens 502 in the coupled state may be positioned over the third lens 503. For another example, a space may be formed between the second lens 502 and the third lens 503, and may facilitate movement of the second lens 502.

In an embodiment, the first lens 501 may be disposed over the second lens 502. For example, at least a part of the second lens 502 may be coupled to a lower surface of the first lens 501. In a specific example, at least a part of an upper surface of the second lens 502 may be in contact with and coupled to the lower surface of the first lens 501, and may be fixed by being coupled.

In an embodiment, the first lens 501 may be connected to the third lens 503 or the OIS carrier 512. For example, the first lens 501 may be connected, through a connection member (not shown), with the third lens 503 that moves together with the OIS carrier 512 in order to interlock with the OIS carrier 512 for the execution of the OIS function. For another example, as the first lens 501 may be connected to the OIS carrier 512 for the executing the OIS function, the first lens 501 may be connected to the OIS carrier 512 through the connection member (not shown).

In an embodiment, the first lens 501 may move in a same direction as the movement of the OIS carrier 512, according to the movement of the OIS carrier 512.

In an embodiment, the first lens 501, the second lens 502, and the third lens 503 may be disposed along the optical axis.

Figure 7:
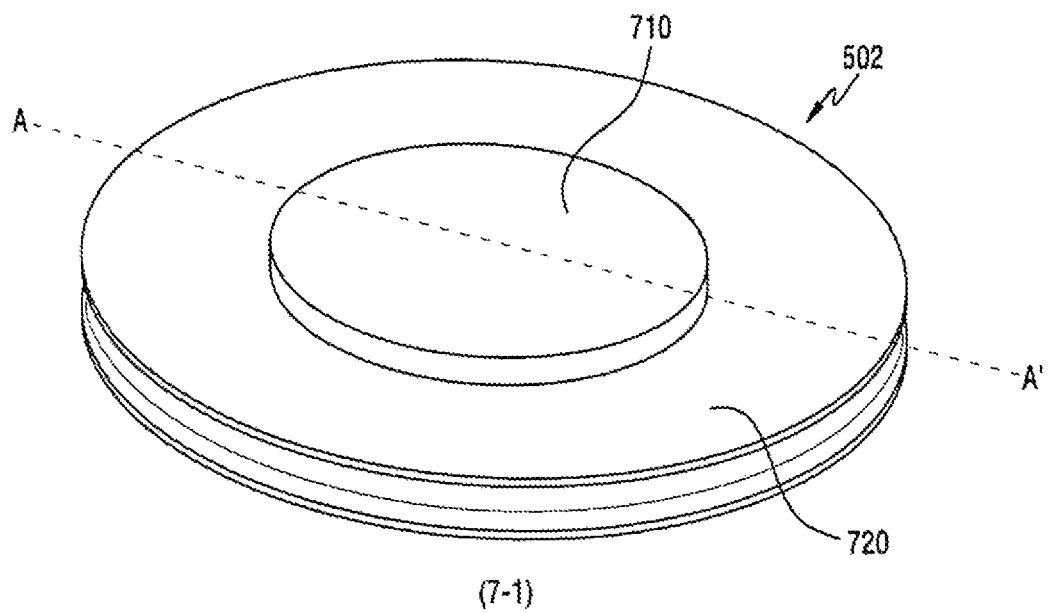
FIG. 7 is a diagram illustrating a structure of a specific lens included in a camera according to an embodiment.
Figure 7:
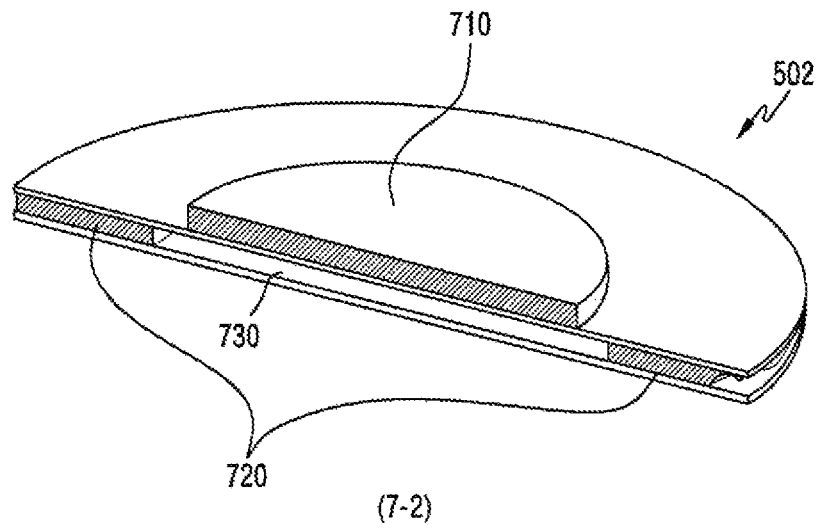

FIG. 7 is a diagram illustrating a structure of a specific lens included in a camera according to an embodiment. In detail, FIG. 7 may be a structure of the second lens 502 included in the camera 300.

According to an embodiment, FIG. 7-1 may be a perspective diagram showing an external appearance of the second lens 502.

In an embodiment, the external appearance of the second lens 502 may include a first portion 710 and a second portion 720. For example, the first portion 710 may form an upper external appearance of the second lens 502, and the second portion 720 may form a lower external appearance of the second lens 502. For another example, a step may be formed between the first portion 710 and the second portion 720.

In an embodiment, a region within a first distance from the center of the second lens 502 may be a region in which the first portion 710 is formed. In an embodiment, a region within a second distance greater than the first distance from the center of the second lens 502 may be a region in which the second portion 720 is formed.

In an embodiment, the first portion 710 may be coupled to the second portion 720 having a larger cross-sectional area than the first portion 710.

In an embodiment, the first portion 710 of the second lens 502 may include a glass, and may be nondeformable by an external force, and may maintain a fixed shape.

According to an embodiment, FIG. 7-2 may show a cross-section of the second lens 502 taken along line A-A'.

In an embodiment, the second portion 720 of the second lens 502 may include a third portion 730. For example, the second portion 720 may be formed in a position corresponding to the first portion 710 while surrounding the third portion 730. For another example, an area of the third portion 730 may be larger than an area of the first portion 710.

In an embodiment, an interior of the third portion 730 may be at least partly filled with a liquid oil.

In an embodiment, a periphery of the second portion 720 and the third portion 730 may be formed of a membrane.

In an embodiment, the form of the second lens 502 may be deformable. For example, at least a part of the second portion 720 of the second lens 502 and an AF carrier (e.g., the AF carrier 511) or a connection member (e.g., the connection member 521) may be coupled. Also, the second lens 502 may be subjected to an external force resulting from the movement of the AF carrier (e.g., the AF carrier 511) along the direction of the optical axis. When the AF carrier (e.g., the AF carrier 511) moves along the optical axis while coupled with at least a part of the second portion 720, the second portion 720 may be bent (i.e., deformed) according to the direction of movement of the AF carrier (511.

In an embodiment, as the form of the second lens 502 is changes by deformation, a curvature of the second lens 502 may also be changed. For example, when the second portion 720 of the second lens 502 is subjected to an upward external force by the AF carrier (e.g., the AF carrier 511), the third portion 730 may be bent convexly downward. For another example, when the second portion 720 of the second lens 502 is subjected to a downward external force by the AF carrier (e.g., the AF carrier 511), the third portion 730 may be bent convexly upward. When the third portion 730 is bent by the external force of the AF carrier (e.g., the AF carrier 511), the curvature of the second lens 502 may be changed.

In certain embodiments, a description of the change of the curvature of the second lens 502 by the AF carrier (e.g., the AF carrier 511) will be made later in detail with reference to FIG. 8.

Figure 8:
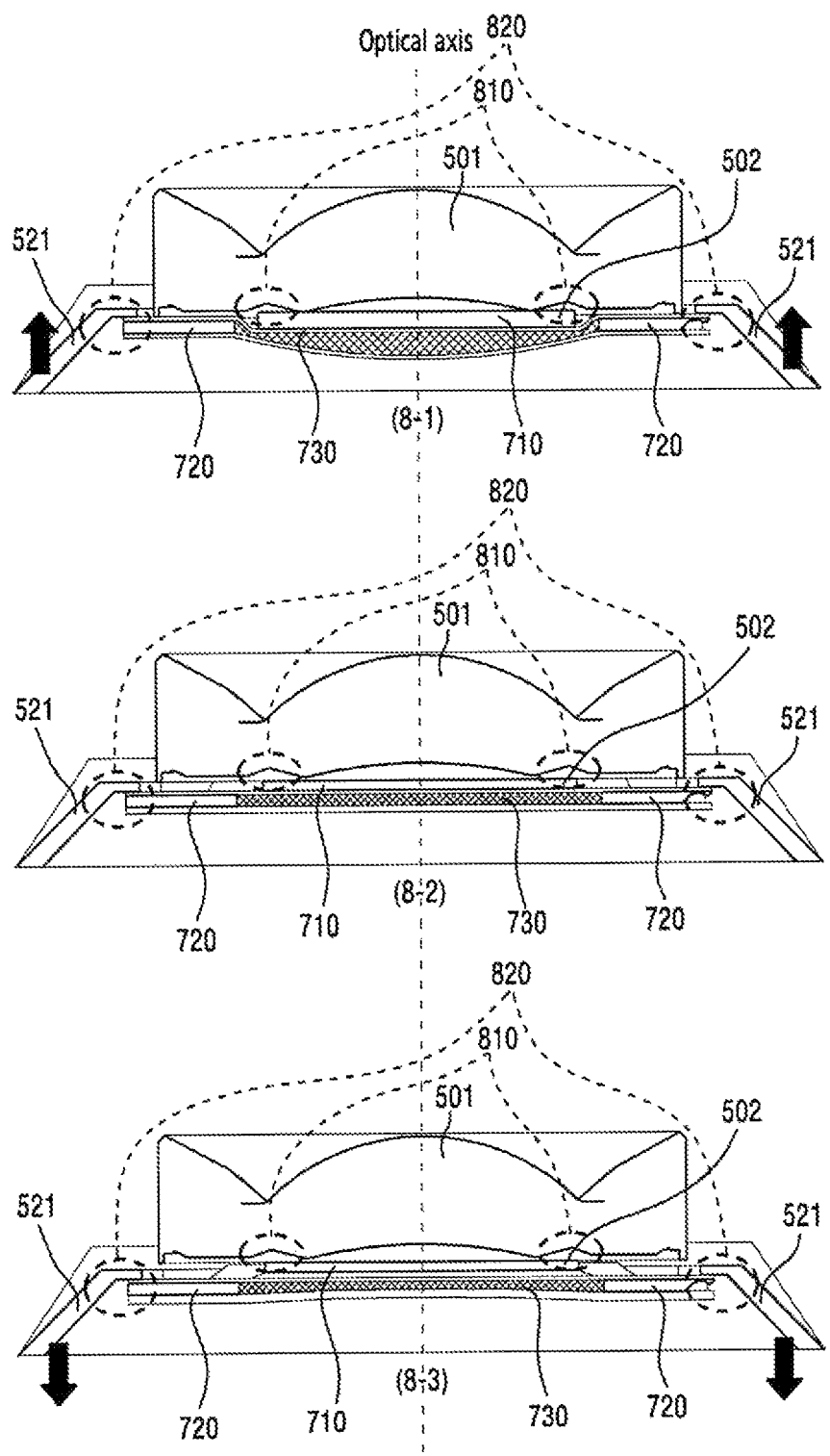
FIG. 8 is a diagram illustrating a structure of a camera performing AF according to an embodiment.

FIG. 8 is a diagram illustrating a structure of a camera performing AF according to an embodiment.

In detail, FIG. 8 mainly illustrates the first lens 501, the second lens 502, and the connection member 521 for description convenience's sake in terms of the camera (e.g., the camera 300) performing AF.

In an embodiment, FIG. 8 illustrates an example in which the connection member 521 applies an external force to the second lens 502, but is not limited thereto, and the same or similar description may be applied even to an embodiment in which the external force is applied to the second lens 502 by the AF carrier (e.g., the AF carrier 511).

In an embodiment, a coupling portion 810 of FIGS. 8-1 to 8-3 illustrates that the first lens 501 and the first portion 710 of the second lens 502 are coupled.

In an embodiment, a coupling portion 820 of FIGS. 8-1 to 8-3 illustrates that the connection member 521 and the second portion 720 of the second lens 502 are coupled.

In an embodiment, referring to FIG. 8-1, the second portion 720 of the second lens 502 may be subjected to an upwards-oriented external force by the connection member 521. For example, as the AF carrier (e.g., the AF carrier 511) moves in an upward direction, the connection member 521 may move in the upward direction. Also, as the connection member 521 connected to the second portion 720 moves in the upward direction, an external force may be applied to the second portion 720 in the upward direction. In this case, as shown, the third portion 730 may be bent downward thereby forming a convex lens according to the orientation thereof, and the second lens 502 may function as a convex lens while the curvature of the second lens 502 is changed.

In an embodiment, referring to FIG. 8-2, the second portion 720 of the second lens 502 is not subjected to a significant external force by the connection member 521. For example, the connection member 521 does not apply an external force to the second portion 720 of the second lens 502 while the camera (e.g., the camera 300) does not perform the AF function. In this case, as shown, the third portion 730 may not be bent, and the second lens 502 may perform a role of a flat lens as the curvature of the second lens 502 does not change.

In an embodiment, referring to FIG. 8-3, the second portion 720 of the second lens 502 may be subjected to a downward external force by the connection member 521. For example, as the AF carrier (e.g., the AF carrier 511) moves in a downward direction, the connection member 521 may also move in the downward direction. Also, as the connection member 521 connected to the second portion 720 moves in the downward direction, an external force may be applied to the second portion 720 in the downward direction. In this case, as shown, the third portion 730 may be bent upward convexly, and the second lens 502 may perform a role of a concave lens as the curvature of the second lens 502 is changed.

Figure 9:
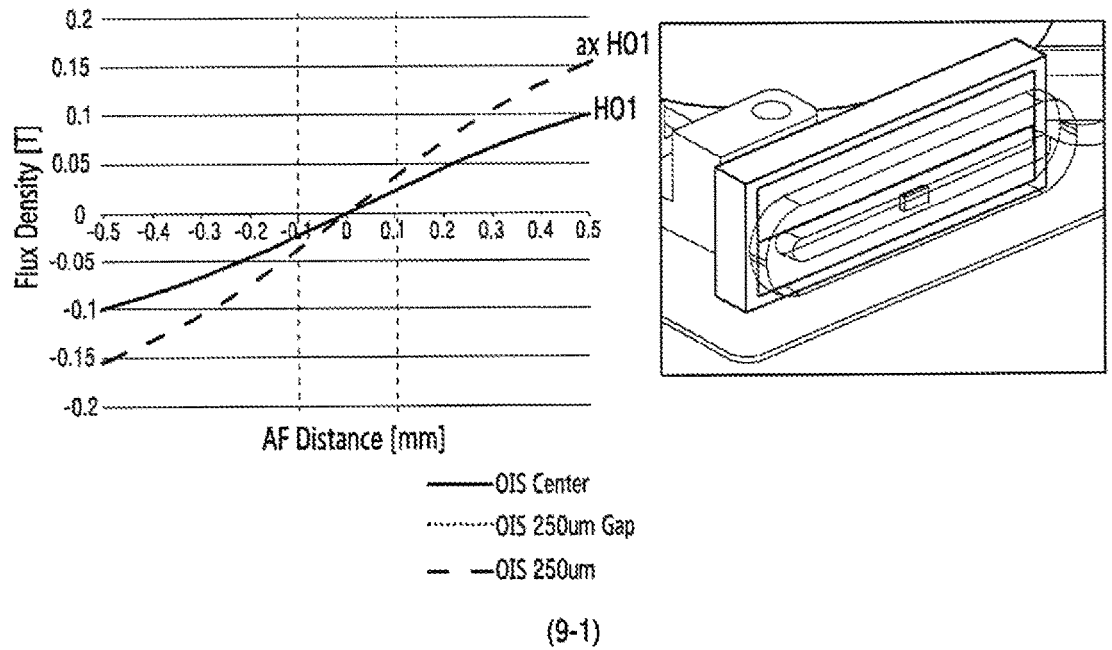
FIG. 9 is a diagram illustrating a structure of a camera including a plurality of Hall sensors according to an embodiment.
Figure 9:
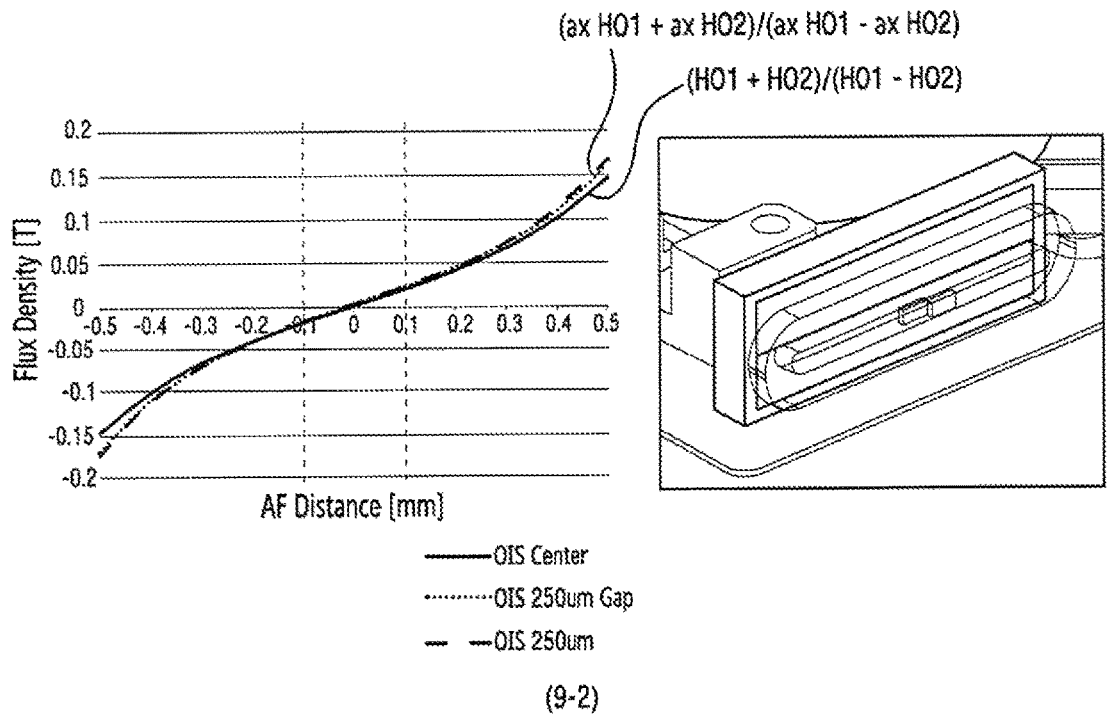

FIG. 9 is a diagram illustrating a structure of a camera including a plurality of Hall sensors according to an embodiment.

In an embodiment, a horizontal axis (or x-axis) of FIGS. 9-1 to 9-2 may correspond to an AF distance, and a vertical axis (or y-axis) may correspond to a magnetic flux density. The AF distance may indicate a distance that is detected by the AF Hall sensor (e.g., the AF Hall sensor 500-2) as a position of an AF magnet (e.g., the AF magnet 511-1) moves farther away or comes into closer proximity with a criterion of a position of the AF Hall sensor (e.g., the AF Hall sensor 500-2). The magnetic flux density may be a magnetic flux density value (or a sensing value) of the AF magnet (e.g., the AF magnet 511-1) detected by the AF Hall sensor (e.g., the AF Hall sensor 500-2).

In an embodiment, FIG. 9-1 is a diagram representing AF sensing when one AF Hall sensor (e.g., the AF Hall sensor 500-2) is disposed in each AF coil (e.g., the AF coil 500-1).

In an embodiment, when OIS is not performed and thus lenses (e.g., the first lens 501, the second lens 502, and the third lens 503) are disposed along an optical axis, a sensing value (e.g., HO1) of the AF Hall sensor (e.g., the AF Hall sensor 500-2) may be the form of a solid line in a graph.

In an embodiment, when OIS is performed and thus the lenses (e.g., the first lens 501, the second lens 502, and the third lens 503) move by a predetermined distance in a direction perpendicular to the optical axis, a sensing value (e.g., a×HO1) of the AF Hall sensor (e.g., the AF Hall sensor 500-2) may be the form of a dotted line in the graph.

In an embodiment, there may be an error of AF sensing resulting from OIS execution when one AF Hall sensor (e.g., the AF Hall sensor 500-2) is disposed in each AF coil (e.g., the AF coil 500-1).

In an embodiment, FIG. 9-2 is a diagram illustrating AF sensing when a plurality (e.g., two) of AF Hall sensors (e.g., the AF Hall sensor 500-2) are disposed in each AF coil (e.g., the AF coil 500-1).

In an embodiment, referring to FIG. 9-2, the plurality (e.g., two) of AF Hall sensors (e.g., the AF Hall sensors 500-2) may be spaced a predetermined distance apart and installed in each AF coil (e.g., the AF coils 500-1) in an optical axis direction and a direction substantially perpendicular to the optical axis. For example, one Hall sensor may be disposed distally away from another Hall sensor, by a predetermined distance (e.g., about 0.1 mm) in the optical axis direction and a predetermined distance (e.g., about 1.0 mm) in the direction substantially perpendicular to the optical axis. The predetermined distance may be implemented in various ways according to design, and the above-described numerical value is one example and may not be limited thereto.

In an embodiment, when the OIS function is not performed and the lenses (e.g., the first lens 501, the second lens 502, and the third lens 503) remain disposed along the optical axis, a sensing value (e.g., (HO1+HO2)×(HO1−HO2)) of the AF Hall sensor (e.g., the AF Hall sensor 500-2) may take the form of a solid line in the graph.

In an embodiment, when the OIS function is performed and the lenses (e.g., the first lens 501, the second lens 502, and the third lens 503) are moved by a predetermined distance in a direction substantially perpendicular to the optical axis, a sensing value (e.g., (a×HO1+a×HO2)/(a×HO1−a×HO2)) of the AF Hall sensor (e.g., the AF Hall sensor 500-2) may take the form of a dotted line in the graph.

In an embodiment, when the plurality (e.g., two) of AF Hall sensors (e.g., the AF Hall sensors 500-2) are disposed in each AF coil (e.g., the AF coil 500-1), the error of the AF sensing resulting from the OIS execution may be reduced.

In an embodiment, to reduce the above-described error of AF sensing resulting from the OIS execution, AF coils (e.g., the AF coils 500-1) may be disposed symmetrically about the optical axis. For example, the AF coils 500-1 are mutually symmetric at opposite sides with a criterion of the lenses (e.g., the first lens 501, the second lens 502, and the third lens 503) arranged on the optical axis.

In an embodiment, errors in AF sensing may be reduced based on a plurality of sensing values of the plurality of AF Hall sensors (e.g., the AF Hall sensors 500-2) disposed in the AF coils (e.g., the AF coil 500-1).

In an embodiment, to prevent the OIS carrier 512 from being affected by the force of moving the AF carrier (e.g., the AF carrier 511) in the direction of the optical axis, a binding force stabilizing the OIS carrier 512 with the housing 500 may be set to be greater than a maximum driving force of the AF carrier (e.g., the AF carrier 511).

In an embodiment, although not shown, the AF Hall sensors (e.g., the AF Hall sensors 500-2) may be disposed symmetrically about the optical axis of the lenses (e.g., the first lens 501, the second lens 502, and the third lens 503). The error of the AF sensing may be reduced based on an average value of sensing values of the respective AF Hall sensors (e.g., the AF Hall sensors 500-2).

Figure 10:
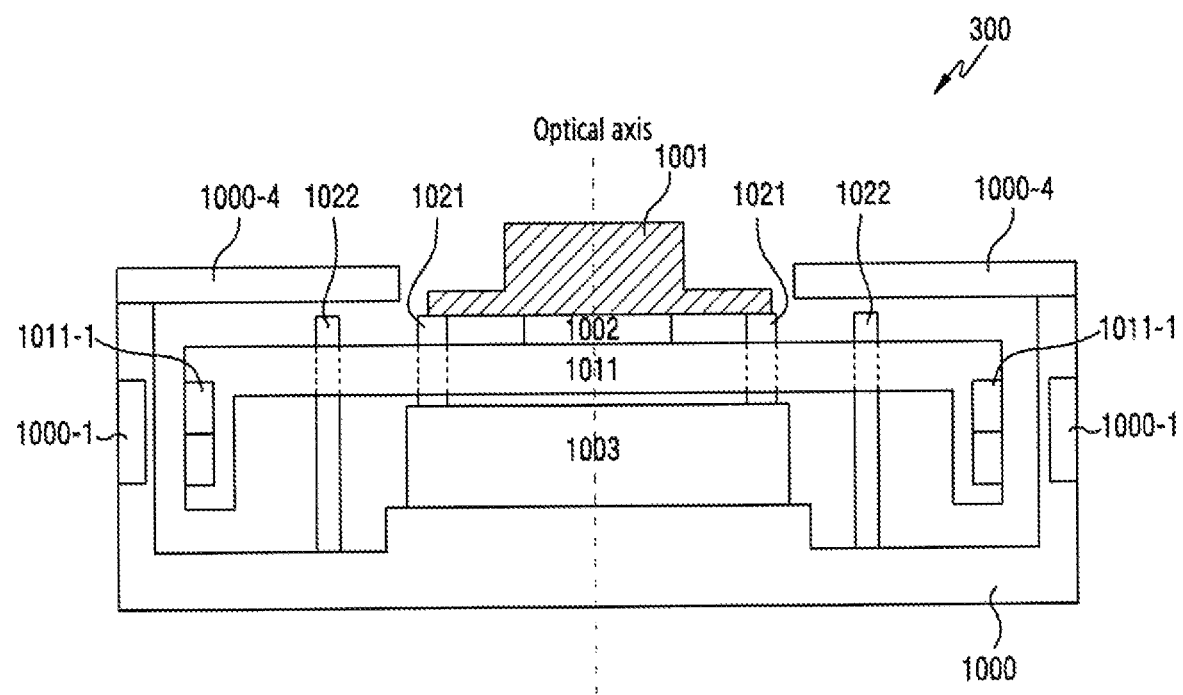
FIG. 10 is a diagram conceptually illustrating a structure of a camera according to another embodiment.

FIG. 10 is a diagram conceptually illustrating a structure of a camera according to another embodiment. In detail, FIG. 10 is a diagram conceptually illustrating a structure and connection relationship of the camera 300 performing AF.

In an embodiment, a first lens 1001, a second lens 1002, and a third lens 1003 may be disposed along an optical axis.

In an embodiment, a housing 1000 may form a periphery of the camera 300 while surrounding at least the first lens 1001, the second lens 1002, the third lens 1003, and an AF carrier 1011.

In an embodiment, the housing 1000 may include an AF coil 1000-1, and the AF coil 1000-1 may be disposed symmetrically about the optical axis.

In an embodiment, the AF coil 1000-1 may include an AF Hall sensor (not shown). The AF Hall sensor (not shown) may detect a position of an AF magnet 1011-1.

In an embodiment, the third lens 1003 may be disposed on the housing 1000.

In an embodiment, the AF carrier 1011 may be disposed over the third lens 1003. For example, an AF driving shaft 1022 may be coupled onto the housing 1000, and the AF carrier 1011 may be coupled to the AF driving shaft 1022. Also, the AF carrier 1011 may be positionally disposed over the third lens 1003.

In an embodiment, the AF carrier 1011 may include the AF magnet 1011-1. For example, the AF magnet 1011-1 may be disposed symmetrically about the optical axis. For another example, the AF magnet 1011-1 may be disposed in a position of the AF carrier 1011 corresponding to the AF coil 1000-1 disposed in the housing 1000.

In an embodiment, the AF carrier 1011 may be coupled to the second lens 1002. For example, as shown in FIG. 10, the AF carrier 1011 and at least a part of a lower surface of the second lens 1002 may be in contact, and at least a part of the lower surface of the second lens 1002 may be coupled with the AF carrier 1011 in a contact state. For another example, unlike the example shown in FIG. 10, the AF carrier 1011 may be in contact with at least a part of a side surface of the second lens 1002, and at least a part of the side surface of the second lens 1002 may be coupled with the AF carrier 1011 in a contact state. Also, unlike the example shown in FIG. 10, the AF carrier 1011 here may be in contact with at least a part of an upper surface of the second lens 1002, and at least a part of the upper surface of the second lens 1002 may be coupled with the AF carrier 1011 in a contact state.

In an embodiment, the first lens 1001 may be disposed on the second lens 1002. For example, at least a part of the upper surface of the second lens 1002 may be in contact with and coupled with the first lens 1001.

In an embodiment, the first lens 1001 may be coupled to the third lens 1003 through a connection member 1021 (e.g., a straight shaft). For example, at least a part of the first lens 1001 may be coupled to the connection member 1021 and the connection member 1021 may be connected to the third lens 1003, whereby the first lens 1001 and the third lens 1003 may be coupled.

In an embodiment, a shield cover 1000-4 covering the inside of the housing 1000 may be disposed on the housing 1000. For example, the shield cover 1000-4 may form an upper periphery of the camera 300, thereby covering internal components of the housing 1000. For another example, the housing 1000 and the shield cover 1000-4 may form the periphery of the camera 300.

In an embodiment, the first lens 1001 may be visible from the outside of the camera 300 through a hole formed in the shield cover 1000-4. For example, the shield cover 1000-4 may form a part of the periphery of the camera 300, and the shield cover 1000-4 forming the upper periphery has the hole through which the first lens 1001 may be seen.

In an embodiment, a processor (e.g., the processor 120) may control a current flowing through the AF coil 1000-1 included in the housing 1000. For example, the processor 120 may control the movement of the AF magnet 1011-1 by adjusting the electrical current flowing through the AF coil 1000-1. Also, the processor 120 may control the movement of the AF magnet 1011-1, thereby enabling the camera 300 to perform the AF function.

In an embodiment, the processor (e.g., the processor 120) may control the movement of the AF magnet 1011-1 using a Lorentz method and/or a solenoid method.

Figure 11:
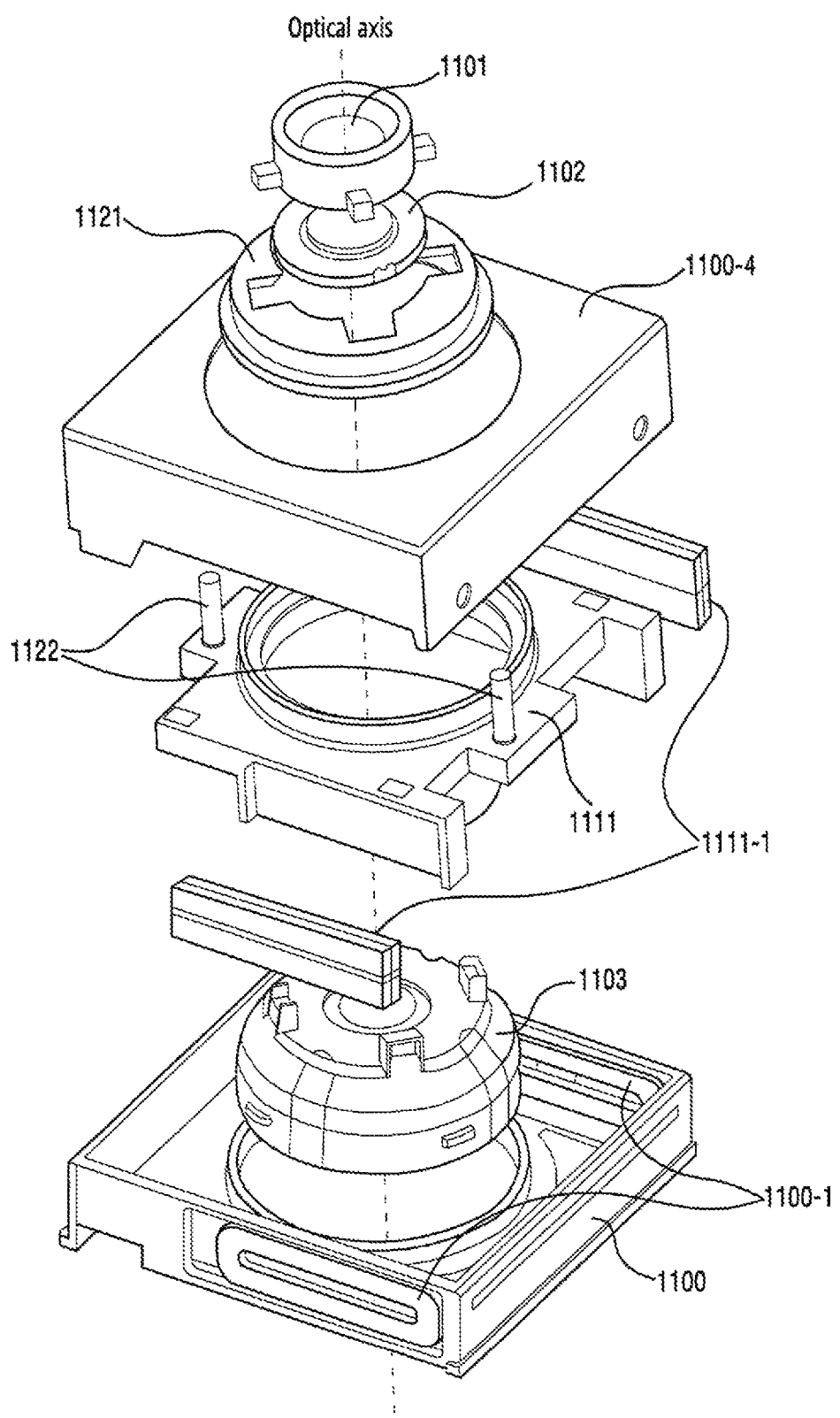
FIG. 11 is an exploded perspective view specifically illustrating a structure of a camera according to another embodiment.

FIG. 11 is an exploded perspective view specifically illustrating a structure of a camera according to another embodiment. FIG. 11 is an exploded perspective view illustrating a specific form of a structure and connection relationship of the camera 300 performing AF conceptually shown in FIG. 10.

In an embodiment, a housing 1100 and a shield cover 1100-4 may form a periphery of the camera 300. For example, the housing 1100 may form a lower periphery of the camera 300, and the shield cover 1100-4 may form an upper periphery of the camera 300. The housing 1100 forming the lower periphery of the camera 300 and the shield cover 1100-4 forming the upper periphery of the camera 300 may be coupled to each other, thereby forming the periphery of the camera 300.

In an embodiment, the housing 1100 may include an AF coil 1100-1. For example, the AF coil 1100-1 may be disposed in the housing 1100 symmetrically about an optical axis. For another example, the AF coil 110-1 may be disposed at a side surface of the housing 1100.

In an embodiment, a third lens 1103 may be disposed on the housing 1100.

In an embodiment, an AF carrier 1111 may be disposed on the housing 1100 and the third lens 1103. For example, an AF driving shaft 1122 may be coupled onto the housing 1100, and the AF driving shaft 1122 may be coupled to the AF carrier 1111. Also, the AF carrier 1111 may be positionally disposed over the third lens 1103.

In an embodiment, an AF magnet 1111-1 may be coupled to the AF carrier 1111. For example, the AF magnet 1111-1 may be coupled to the AF carrier 1111 symmetrically about the optical axis. For another example, the AF magnet 1111-1 may be disposed in a position of the AF carrier 1111 corresponding to a position of the AF coil 1100-1 disposed in the housing 1100.

In an embodiment, the AF carrier 1111 may be coupled to a second lens 1102 without a connection member. For example, at least a part of the AF carrier 1111 may be in contact with the second lens 1102, thereby being coupled to the second lens 1102 without the a connection member.

In an embodiment, the AF carrier 1111 may be coupled to the second lens 1102 by a connection member 1121. For example, the AF carrier 1111 and the second lens 1102 may be connected through the connection member 1121. At least a part of the AF carrier 1111 and the connection member 1121 are coupled, and the connection member 1121 and the second lens 1102 are coupled, whereby the AF carrier 1111 and the second lens 1102 may be coupled.

In an embodiment, the AF carrier 1111 and the second lens 1102 may be coupled, whereby at least a part of the second lens 1102 may move together via the movement of the AF carrier 1111.

In an embodiment, the first lens 1101 may be disposed on the second lens 1102. For example, the first lens 1101 may be positionally disposed on the second lens 1102. Since first lens 1101 does not move in a direction of the optical axis, the first lens 1101 may not participate in execution of the AF function. For another example, at least a part of an upper surface of the second lens 1102 may be in contact and coupled with a lower surface of the first lens 1101.

In an embodiment, the first lens 1101, the second lens 1102, and the third lens 1103 may be disposed along the optical axis.

In an embodiment, the housing 1100 and the shield cover 1100-4 may form a periphery of the camera 300 while surrounding the AF carrier 1111 and the lenses (e.g., the first lens 1101, the second lens 1102, and the third lens 1103).

In an embodiment, the AF carrier 1111 may move along the optical axis. For example, the AF carrier 1111 may move along the optical axis direction via a driving force generated from the AF coil 1100-1 and the AF magnet 1111-1.

An electronic device (e.g., the electronic device 101) of an embodiment may include a housing (e.g., the housing 400) including an OIS coil (e.g., the OIS coil 400-3) and an AF coil (e.g., the AF coil 400-1), a first lens (e.g., the first lens 401) disposed along an optical axis within the housing (e.g., the housing 400), a second lens (e.g., the second lens 402) disposed under the first lens (e.g., the first lens 401), and a third lens (e.g., the third lens 403) disposed under the second lens (e.g., the second lens 402), the second lens (e.g., the second lens 402) being deformed in shape according to a position of an AF carrier (e.g., the AF carrier 411), an OIS carrier (e.g., the OIS carrier 412) including an OIS magnet (e.g., the OIS magnet 412-1) in a position corresponding to the OIS coil (e.g., the OIS coil 400-3) of the housing (e.g., the housing 400) to move the third lens (e.g., the third lens 403) in a direction perpendicular to the optical axis, the AF carrier (e.g., the AF carrier 411) coupled onto the OIS carrier (e.g., the OIS carrier 412), and including an AF magnet (e.g., the AF magnet 411-1) in a position corresponding to the AF coil (e.g., the AF coil 400-1) of the housing (e.g., the housing 400) to move the second lens (e.g., the second lens 402) in an optical axis direction, and a processor (e.g., the processor 120) electrically connected to the OIS coil (e.g., the OIS coil 400-3) and the AF coil (e.g., the AF coil 400-1). The processor (e.g., the processor 120) may move at least the third lens (e.g., the third lens 403) in the direction perpendicular to the optical axis by using the OIS carrier (e.g., the OIS carrier 412), by controlling a current applied to the OIS coil (e.g., the OIS coil 400-3), and deform a shape of the second lens (e.g., the second lens 402) by using the AF carrier (e.g., the AF carrier 411), by controlling a current applied to the AF coil (e.g., the AF coil 400-1).

In the electronic device (e.g., the electronic device) of an embodiment, the second lens (e.g., the second lens 402) may include a first portion (e.g., the first portion 710) and a second portion (e.g., the second portion 720), and the first portion (e.g., the first portion 710) may be coupled by contacting with the first lens (e.g., the first lens 401), and the second portion (e.g., the second portion 720) may be coupled to the AF carrier (e.g., the AF carrier 411).

In the electronic device (e.g., the electronic device 101) of an embodiment, the second portion (e.g., the second portion 720) may include a third portion (e.g., the third portion 730), and the third portion (e.g., the third portion 730) may include a liquid oil.

In the electronic device (e.g., the electronic device 101) of an embodiment, a cross-sectional area of the third portion (e.g., the third portion) may be greater than a cross-sectional area of the first portion (e.g., the first portion 710).

In the electronic device (e.g., the electronic device 101) of an embodiment, in the deforming of the second lens (e.g., the second lens 402), the AF carrier (e.g., the AF carrier 411) is coupled to at least a part of the second portion, and the AF carrier (e.g., the AF carrier 411) applies an external force to at least a part of the second portion (e.g., the second portion 720), whereby the second lens (e.g., the second lens 402) may be deformed.

In the electronic device (e.g., the electronic device 101) of an embodiment, as the shape of the second lens (e.g., the second lens 402) is deformed according to the position of the AF carrier (e.g., the AF carrier 411), a curvature of the second lens (e.g., the second lens 402) may be changed.

In the electronic device (e.g., the electronic device 101) of an embodiment, the first lens (e.g., the first lens 401) may be coupled to the third lens (e.g., the third lens 403) through a connection member.

In the electronic device (e.g., the electronic device 101) of an embodiment, the second lens (e.g., the second lens 402) may be coupled to the AF carrier (e.g., the AF carrier 411) through a connection member.

In the electronic device (e.g., the electronic device 101) of an embodiment, the AF carrier (e.g., the AF carrier 411) may be coupled onto the OIS carrier (e.g., the OIS carrier 412) through an AF driving shaft.

In the electronic device (e.g., the electronic device 101) of an embodiment, the OIS carrier (e.g., the OIS carrier 412) may be disposed on an OIS ball within the housing (e.g., the housing 400).

In the electronic device (e.g., the electronic device 101) of an embodiment, the housing (e.g., the housing 400) may include a plurality of Hall sensors in positions corresponding to the AF coils (e.g., the AF coil 400-1).

In the electronic device (e.g., the electronic device 101) of an embodiment, the processor (e.g., the processor 120) may detect a position of the AF carrier (e.g., the AF carrier 411) through the plurality of Hall sensors.

In the electronic device (e.g., the electronic device 101) of an embodiment, an empty space may be formed between the second lens (e.g., the second lens 402) and the third lens (e.g., the third lens 403).

In the electronic device (e.g., the electronic device 101) of an embodiment, in the deforming of the second lens (e.g., the second lens 402), the second lens (e.g., the second lens 402) may perform a role of a convex lens when being bent downward convexly, and the second lens (e.g., the second lens 402) may perform a role of a concave lens when being bent upward convexly.

In the electronic device (e.g., the electronic device 101) of an embodiment, at least a part of a periphery of the second lens (e.g., the second lens 402) may be formed of a membrane.

An electronic device (e.g., the electronic device 101) of an embodiment may include a housing (e.g., the housing 1100) including an AF coil (e.g., the AF coil 1100-1), a first lens (e.g., the first lens 1001) disposed along an optical axis within the housing (e.g., the housing 1100), a second lens (e.g., the second lens 1002) disposed under the first lens (e.g., the first lens 1001), and a third lens (e.g., the third lens 1003) disposed under the second lens (e.g., the second lens 1002), wherein the second lens (e.g., the second lens 1002) is deformed in shape according to a position of an AF carrier (e.g., the AF carrier 1011), the AF carrier (e.g., the AF carrier 1011) coupled onto the housing (e.g., the housing 1100), and including an AF magnet (e.g., the AF magnet 1011-1) in a position corresponding to the AF coil (e.g., the AF coil 1100-1) of the housing (e.g., the housing 1100) to move the second lens (e.g., the second lens 1002) in an optical axis direction, and a processor (e.g., the processor 120) electrically connected to the AF coil (e.g., the AF coil 1100-1). The processor (e.g., the processor 120) may deform a shape of the second lens (e.g., the second lens 1002) by using the AF carrier (e.g., the AF carrier 1011), by controlling a current applied to the AF coil (e.g., the AF coil 1100-1).

In the electronic device (e.g., the electronic device 101) of an embodiment, the second lens (e.g., the second lens 1002) may include a first portion and a second portion, and the first portion may be coupled by contacting with the first lens (e.g., the first lens 1001), and the second portion may be coupled to the AF carrier (e.g., the AF carrier 1011).

In the electronic device (e.g., the electronic device 101) of an embodiment, the second portion may include a third portion, and the third portion may include a liquid oil.

In the electronic device (e.g., the electronic device 101) of an embodiment, in the deforming of the second lens (e.g., the second lens 1002), the AF carrier (e.g., the AF carrier 1011) is coupled to at least a part of the second portion, and the AF carrier (e.g., the AF carrier 1011) applies an external force to at least a part of the second portion, whereby the second lens (e.g., the second lens 1002) may be deformed.

In the electronic device (e.g., the electronic device 101) of an embodiment, as the shape of the second lens (e.g., the second lens 1002) is deformed according to the position of the AF carrier (e.g., the AF carrier 1011), a curvature of the second lens (e.g., the second lens 1002) may be changed.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a housing, including an optical image stabilization (OIS) coil and an auto-focus (AF) coil;
   a first lens disposed along an optical axis disposed within the housing, a second lens disposed under the first lens, and a third lens disposed under the second lens, wherein the second lens is deformable according to movement of an AF carrier;

an OIS carrier including an OIS magnet disposed in a position corresponding to the OIS coil of the housing, and is configured to move the third lens in a direction perpendicular to the optical axis;

wherein the AF carrier is coupled to the OIS carrier, and includes an AF magnet disposed in a position corresponding to the AF coil, and configured to move the second lens along the optical axis; and a processor electrically connected to the OIS coil and the AF coil, wherein the processor is configured to:

control application of a current to the OIS coil to move the OIS carrier, resulting in movement of at least the third lens in the direction perpendicular to the optical axis, and control application of a current to the AF coil to deform the second lens by movement of the AF carrier.

2. The electronic device of claim 1, wherein the second lens includes a first portion and a second portion,
wherein the first portion is coupled to the first lens so as to contact the first lens, and
wherein the second portion is coupled to the AF carrier.

3. The electronic device of claim 2, wherein the second portion includes a third portion including a liquid oil.

4. The electronic device of claim 3, wherein a cross-sectional area of the third portion is greater than a cross-sectional area of the first portion.

5. The electronic device of claim 3, wherein the AF carrier is coupled to at least a part of the second portion, and
wherein the AF carrier applies an external force to at least a part of the second portion, whereby the second lens is deformed.

6. The electronic device of claim 1, wherein as a shape of the second lens is deformed according to the movement of the AF carrier, a curvature of the second lens is changed.

7. The electronic device of claim 1, wherein the first lens is coupled to the third lens through a connection member.

8. The electronic device of claim 1, wherein the second lens is coupled to the AF carrier through a connection member.

9. The electronic device of claim 1, wherein the AF carrier is coupled onto the OIS carrier through an AF driving shaft.

10. The electronic device of claim 1, wherein the OIS carrier is disposed on an OIS ball bearing disposed within the housing.

11. The electronic device of claim 1, wherein the housing includes a plurality of Hall sensors disposed in positions corresponding to the AF coils.

12. The electronic device of claim 11, wherein the processor is configured to detect a position of the AF carrier through the plurality of Hall sensors.

13. The electronic device of claim 1, wherein an empty space is formed between the second lens and the third lens.

14. The electronic device of claim 1,
wherein when the second lens is deformed downwards away from a surface of the electronic device through which an external environment is visible to the first lens, the second lens operates as a convex lens, and
wherein when the second lens is deformed upwards towards the surface through which the external environment is visible to the first lens, the second lens operates as a concave lens.

15. The electronic device of claim 1, wherein at least a part of a periphery of the second lens is formed of a membrane.

16. An electronic device comprising:
a housing including an auto-focus (AF) coil;
a first lens disposed along an optical axis within the housing, a second lens disposed under the first lens, and a third lens disposed under the second lens, wherein the second lens is deformable according to movement of an AF carrier;
wherein the AF carrier is coupled onto the housing, and includes an AF magnet disposed in a position corresponding to the AF coil of the housing, and is configured to move the second lens along the optical axis; and
a processor electrically connected to the AF coil,
wherein the processor is configured to:
control application of a current to the AF coil to cause the AF carrier to move and deform the second lens.

17. The electronic device of claim 16, wherein the second lens includes a first portion and a second portion,
wherein the first portion is coupled to the first lens and contacts the first lens, and
wherein the second portion is coupled to the AF carrier.

18. The electronic device of claim 17, wherein the second portion includes a third portion, and the third portion includes a liquid oil.

19. The electronic device of claim 17,
wherein the AF carrier is coupled to at least a part of the second portion, and
wherein the AF carrier applies an external force to at least a part of the second portion, whereby the second lens is deformed.

20. The electronic device of claim 16, wherein as a shape of the second lens is deformed according to movement of the AF carrier, a curvature of the second lens is changed.

* * * * *